US008616450B2

(12) United States Patent
Jelinek

(10) Patent No.: US 8,616,450 B2
(45) Date of Patent: Dec. 31, 2013

(54) MATRIX CODE SCANNER WITH ORTHOGONAL TRANSFER CHARGE-COUPLED DEVICE

(75) Inventor: Jan Jelinek, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 43 days.

(21) Appl. No.: 13/277,676

(22) Filed: Oct. 20, 2011

(65) Prior Publication Data

US 2013/0099001 A1 Apr. 25, 2013

(51) Int. Cl.
*G06K 7/00* (2006.01)

(52) U.S. Cl.
USPC .......................................... 235/439; 235/435

(58) Field of Classification Search
USPC ................................................ 235/439, 435
See application file for complete search history.

(56) References Cited

U.S. PATENT DOCUMENTS

| | | | | |
|---|---|---|---|---|
| 2001/0019361 | A1 * | 9/2001 | Savoye | 348/222 |
| 2009/0189987 | A1 * | 7/2009 | Muramatsu et al. | 348/208.5 |
| 2011/0187880 | A1 * | 8/2011 | Jelinek | 348/222.1 |

* cited by examiner

*Primary Examiner* — Thien M Le
*Assistant Examiner* — Christle Marshall
(74) *Attorney, Agent, or Firm* — Schwegman, Lundberg & Woessner, P.A.

(57) ABSTRACT

A hand held matrix code scanner includes an orthogonal transfer charge-coupled device (OTCCD), a controller coupled to the OTCCD, and a sensor coupled to the controller. The sensor senses movement of the scanner The controller is configured to move a first location of the OTCCD array to a second location as a function of data from the sensor to compensate for the device motion during image exposure.

17 Claims, 2 Drawing Sheets

MATRIX CODE SCANNER WITH ORTHOGONAL TRANSFER CHARGE-COUPLED DEVICE

TECHNICAL FIELD

The present disclosure relates to a matrix code scanner with an orthogonal transfer charge-coupled device (OTCCD).

BACKGROUND

In contrast to a barcode, which is one-dimensional in its nature and thus can be read using a line scan, the reading of a matrix code requires a two-dimensional image. The amount of light energy to obtain a well exposed two dimensional image is orders of magnitude greater than that needed for the one-dimensional nature of barcodes. Consequently, target illumination is the major power consumer in matrix code readers, and it limits their uptime between recharging or battery replacement.

In typical warehouse applications, boxes labeled with matrix codes sit on shelves and are thus stationary. The user points his or her device at a code in order to read it. Due to their unstable hand, the resulting motion of the device relative to the code will blur the code image, thereby making it useless unless a very short exposure is used to limit the motion blur. However, the shorter the exposure, the brighter the illumination that is needed. Reducing the required illuminating power would extend the device uptime and reduce, if not completely eliminate, the eye safety restrictions and their impact on device performance. Extending the exposure by one to two orders of magnitude may even allow operating the scanner using only ambient light.

DETAILED DESCRIPTION

In an embodiment, the image projection onto a device sensor, such as a hand-held matrix code scanner, during exposure is stabilized, and thus the needed illumination power is reduced. In this embodiment, the image stabilizing element is an Orthogonal Transfer Charge-Coupled Device (OTCCD) sensor array (developed by the Lincoln Labs at the Massachusetts Institute of Technology (MIT)).

While optical image stabilization is routinely used in high end photographic lenses, it is normally accomplished by means of a moveable stabilizing lens inside the camera objective. Being rather heavy, the lens exhibits significant inertia, which limits its dynamic responsiveness and consumes considerable energy to overcome. Moreover, the whole design is mechanically delicate, and the optics demand careful handling.

In contrast, the image stabilization embodiment using an OTCCD involves no moving parts, and thus is as rugged as any existing device built with a conventional CCD or CMOS sensors. For the same reason, its power consumption is much lower as well. By extending the exposure from, for example 1 ms to 100 ms, the illumination power can be decreased by the same factor of 100. With exposures of that duration, the device can function with ambient light only in many applications.

An OTCCD sensor can move its array around its silicon wafer as a function of commands from an array shift controller that is coupled to motion sensors. In an embodiment, the array is shifted around so as to counter the handheld device motion and jitter during exposure resulting from an unstable operator's hand. The device motion is measured by one or more inertial sensors in the device body, whose measurements are periodically sampled at a rate of tens to hundreds of samples per second. Using the data, the array shift controller calculates the device motion relative to the location where it was at the moment when the user pressed a device trigger and initiated the code reading process. Stabilizing the image of the matrix scanner allows increasing the exposure time, thus reducing the required illumination power, and thus extending the battery life and/or time between battery recharging.

Figure 1:
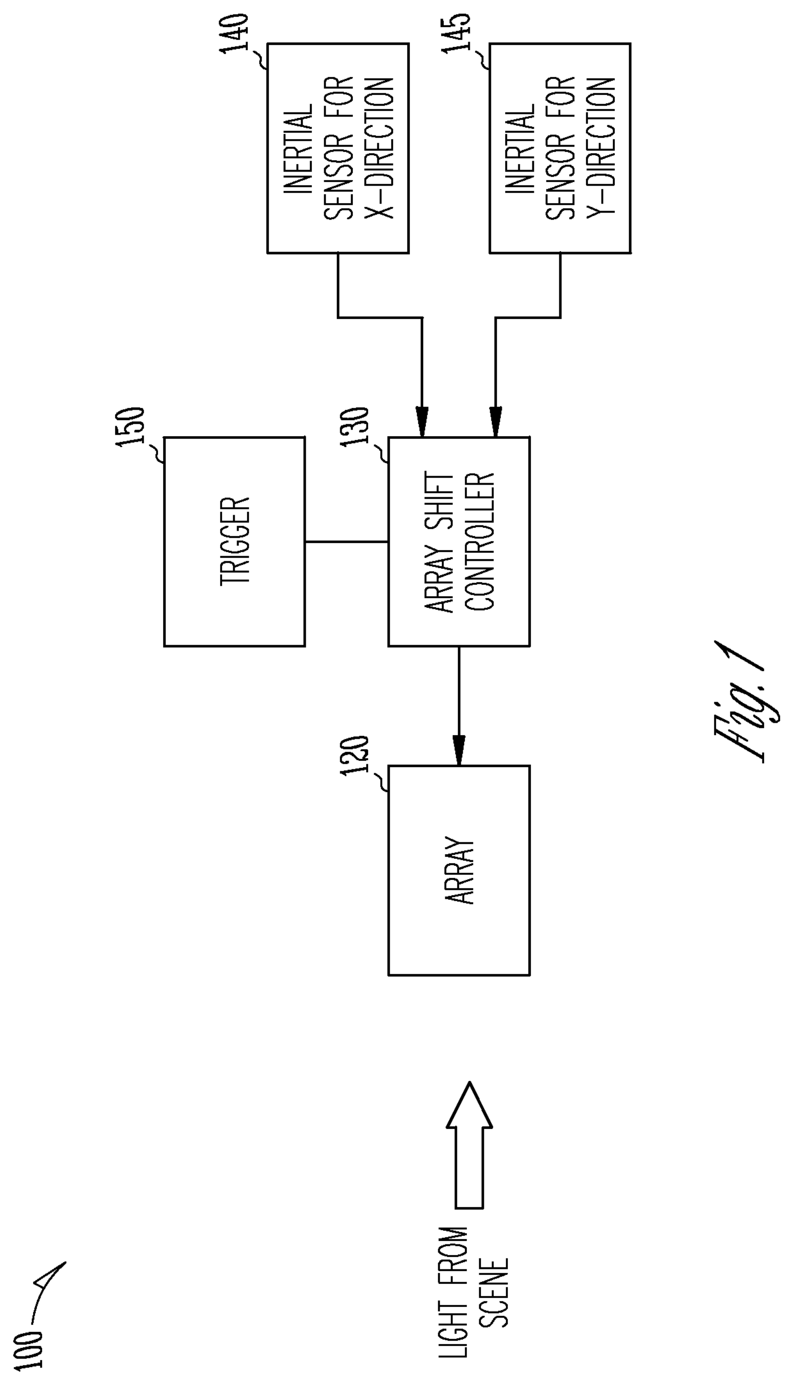
FIG. 1 is a block diagram of a control system for a matrix code scanner.

FIG. 1 is a block diagram of a hand held scanner system 100 that uses an OTCCD to stabilize an image. Light enters the OTCCD scanner 100 and impinges upon an array 120. The array 120 is coupled to an array shift controller 130. The array shift controller 130 is coupled to and receives input from an inertial sensor 140 and an inertial sensor 145. In an embodiment, the inertial sensor 140 senses movement in a first direction, and the inertial sensor 145 senses movement in a second direction, wherein the first direction is perpendicular to the second direction. In another embodiment, the sensors 140 and 145 can be part of a single sensor, which includes hardware to sense movement in a first direction and a second direction. The matrix code scanner 110 further includes a trigger 150 coupled to the pixel shift controller 130.

In one embodiment, the inertial sensors 140, 145 may be gyroscopes to measure the angular rate of device motion. In another embodiment, they are linear accelerometers to measure translational motion. In yet another embodiment, each is an assembly integrating both a gyroscope and linear accelerometer. The electronics needed to support the sensors is a standard commercially available hardware, often provided by sensor manufacturers.

Figure 2B:
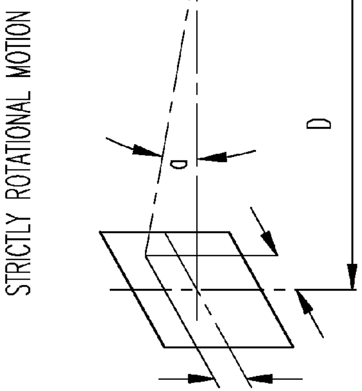
FIGS. 2A, 2B, and 2C are graphical representation of translational and rotational sensor motions.
Figure 2A:
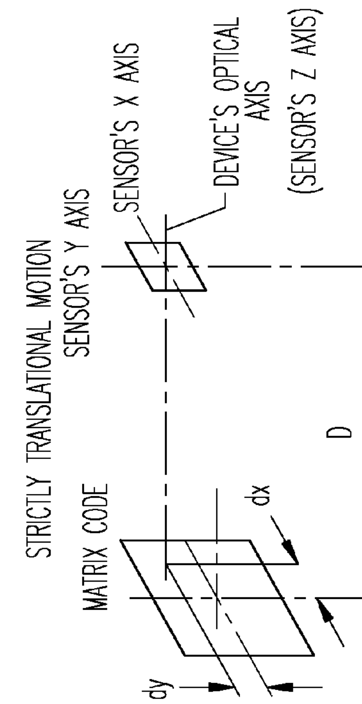
Figure 2C:
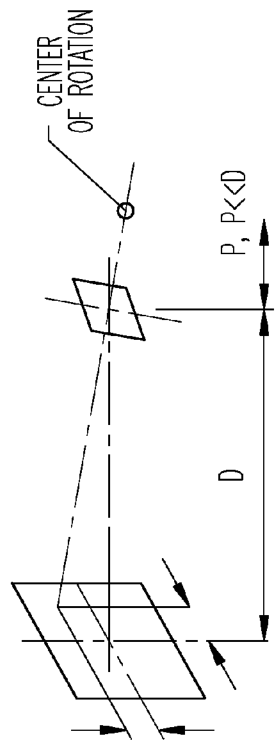

The projection of the matrix code being imaged onto the OTCCD array sensor surface moves as a result of the handheld device's physical movement arising from the user's unstable hold. The physical movement may have only translational (see FIG. 2A) or rotational (see FIG. 2B) components or both (see FIG. 2C). The translation is fully characterized by the three displacements dx, dy, dy along the three coordinate axes x, y, z, respectively, of which the x and y axes run parallel to the horizontal and vertical directions of the matrix code and the z axis points in the direction of the camera. Likewise, the rotation is fully characterized by three rotation angles ax, ay, az around the axes x (called the pitch), y (called the yaw) and z (called the roll), respectively. The angle a between the device's optical axis and the z axis associated with the matrix code target shown in FIGS. 2B and 2C resolves into the three angular coordinates ax, ay, az.

In the above description we chose as a reference a coordinate system associated with the matrix code target. We could have equally well chosen an alternative coordinate system associated with the sensor, with no material effect on the device functionality. Both the translational and rotational movements are relative and thus, from the physical point of view, it is does not matter which part is actually moving. However, the device according to the invention compensates only the motion blur that arises from the device movement.

The sensor translation along the z axis changes the distance between the device and the target. This change, which has only a minor effect on the device performance, cannot be compensated by the OTCCD sensor and thus is not addressed by this invention.

The sensor rotation, az, about the z axis (=the roll) cannot be compensated by the OTCCD sensor and thus is not addressed by this invention.

Whenever the sensor moves relative to the target during image exposure, both its translational and rotational components cause the motion blur. Given the image scenario geometry, the rotational component is far more detrimental because the large distance, D, between the sensor and target amplifies the device motion relative to the target. For example, turning the sensor in FIG. 2B by the angle, ax, of just 1 degree will cause the displacement dx=17.5 mm for a target 1 meter out, which is still a small distance in many applications. With growing distance the displacement will grow proportionally larger. Because such displacements are far larger than the size of matrix code boxes, the code image will be heavily blurred unless this displacement is eliminated.

Handheld devices rarely have their center of rotation coincident with the center of their sensor. Typically, the rotation largely happens about the user's wrist and thus its center is a few tens of millimeters away from the center of the sensor and off the device's optical axis. Such an arrangement has a side effect of adding a small translational component to rotation. Given the known handheld device grip design, in one embodiment this translation can be estimated from the known rotation angles ax, ay, and compensated by the OTCCD along with the effects of the rotations proper. In another embodiment, the proper compensations are calculated from experimental data collected on a sample of users, who are applying the particular device for which such compensation is being determined.

The displacements dx, dy resulting from rotations by the angles ax, ay can be calculated from the angular velocities about the axes y, x, respectively. In one embodiment, the first inertial sensor is a gyroscope measuring the angular velocity of rotation about the y axis and the second inertial sensor is a gyroscope measuring the angular velocity of rotation about the x axis. The gyroscopes provide angular velocity measurements at rates tens to hundreds of samples per second, from which the desired OTCCD shifts are calculated.

For matrix codes that are small in size, translational motion of the device may also become a problem. In one embodiment, the first inertial sensor is a linear accelerometer measuring the linear acceleration along the x axis and the second inertial sensor is a linear accelerometer measuring the linear acceleration along the y axis. Their data are numerically integrated to obtain the translations dx, dy, which are then used to calculate the needed OTCCD shifts to counter the motion.

In an embodiment, the device compensates the effects due to both translations and rotations. It has two sets of inertial sensors for each axis, linear accelerometers for measuring the translations and gyroscopes for measuring the rotations. Their data are used to calculate displacements dxt, dyt due to translation and dxr, dyr due to rotation, which are then added together to provide the total displacements dx=dxt+dxr, dy=dyt+dyr.

The desired OTCCD sensor array shifts are driven by the array shift controller. The controller uses as its input the displacements dx, dy from the current measurement and one or more past displacement measurements, predict where the matrix code projection onto the array sensor will appear in the near future and then commands the OTCCD array to move there.

Shift controllers may use different mathematical models of the predicted motion trajectories. In one embodiment, the controller expects the trajectory extending the observations made so far out into the future to be either a straight line or a circular arc, and dynamically selects between the two depending on the nature of the incoming data.

The controller is configured to receive an indication when the device's trigger is pressed, and to record an initial position of the OTCCD array when the trigger is pressed. From that moment, it periodically updates its commands sent to the OTCCD array sensor as new inertial sensor data come in, making the array track the motion of matrix code projection on the OTCCD sensor surface in a feedback fashion.

At every sampling instant the controller 130 takes the current position and/or orientation of the device 100 furnished by the inertial sensors 140, 145, combines it with the like information stored in its memory from previous two or more sampling instants, and predicts a new location to which to shift the OTCCD in order to best compensate for the physical motion of the device as sensed by the inertial sensors. The motion trajectory is locally approximated by fitting either a straight line or a circular arc or some other simple curve to the current and past data. To predict, the controller extrapolates the fitted curve into the future and determines the point on it where the device is most likely to be found at a specified sampling instant in the future. The point placement is a function of acceleration or deceleration of the movement the matrix code scanner The controller estimates the acceleration or deceleration using the locations at the current instant and two or more previous instants. In its estimation, the controller assumes the acceleration or deceleration trend remains constant until the next frame.

In one embodiment the controller approximates the predicted path leading from the current OTCCD array location to its predicted location by a small number of straight line segments that are then traced by the array. Such subsampling allows simplifying the OTCCD camera electronics without sacrificing the tracking accuracy.

It should be understood that there exist implementations of other variations and modifications of the invention and its various aspects, as may be readily apparent, for example, to those of ordinary skill in the art, and that the invention is not limited by specific embodiments described herein. Features and embodiments described above may be combined with each other in different combinations. It is therefore contemplated to cover any and all modifications, variations, combinations or equivalents that fall within the scope of the present invention.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

I claim:

1. A hand held matrix code scanner comprising:

an orthogonal transfer charge-coupled device (OTCCD) including an array of pixels;

a controller coupled to the OTCCD;

a first sensor, coupled to the controller, for sensing movement of the scanner in a first direction; and a second sensor, coupled to the controller, for sensing movement of the scanner in a second direction;

wherein the controller is configured to move a first location of the OTCCD array to a second location as a function of data from one or more of the first sensor and the second sensor; and wherein the controller executes one or more of closed loop control of the movement of OTCCD array and open loop control of the movement of the OTCCD array.

2. The matrix code scanner of claim 1, wherein one or more of the first sensor and the second sensor comprise an inertial sensor.

3. The matrix code scanner of claim 1, comprising a trigger coupled to the controller, and wherein the controller is configured to receive an indication when the trigger is pressed, and to record an initial position of the OTCCD array when the trigger is pressed.

4. The matrix code scanner of claim 3, wherein the controller is configured to receive data from one or more of the first sensor and the second sensor on a periodic basis, to calculate a change in the initial position of the OTCCD array as a function of the data received on a periodic basis, and to determine a later position of the OTCCD array as a function of the data received on a periodic basis.

5. The matrix code scanner of claim 1, wherein the first direction is perpendicular to the second direction.

6. The matrix code scanner of claim 1, wherein the controller is configured to determine a trajectory of the movement from the first location of the OTCCD array to the second location of the OTCCD array, and to generate sub-samples of the trajectory, thereby providing finer motion tracking.

7. The matrix code scanner of claim 1, wherein the controller is configured to examine the first locations of the OTCCD array at the current sampling instant and at two previous instants, and to determine if the first locations at the current instant and at the two or more previous instants are co-linear.

8. The matrix code scanner of claim 7, wherein the controller is configured to predict the second location of the OTCCD array using a linear extrapolation when the first locations at the current instant and at the two or more previous instants are co-linear.

9. The matrix code scanner of claim 8, wherein the linear extrapolation uses the first locations at the current instant and one or more previous instants.

10. The matrix code scanner of claim 7, wherein the controller is configured to predict the second location of the OTCCD array by fitting a circle to the first locations at the current instant and two or more previous instants when the first locations at the current instant and for the two or more previous instants are not co-linear.

11. The matrix code scanner of claim 7, wherein the controller estimates the acceleration or deceleration using the first locations at the current instant and two or more previous instants, and wherein the controller assumes the acceleration or deceleration trend remains constant until a next frame.

12. A hand held matrix code scanner comprising:

an orthogonal transfer charge-coupled device (OTCCD) including an array;

a controller coupled to the OTCCD;

a trigger coupled to the controller; and one or more sensors, coupled to the controller, for sensing movement of the scanner;

wherein the controller is configured to move a first location of the OTCCD array to a second location as a function of data from the sensor; and wherein the controller is configured to receive an indication when the trigger is pressed, and to record an initial position of the OTCCD array when the trigger is pressed; and wherein the controller is configured to receive data from the sensor on a periodic basis, to calculate a change in the initial position of the OTCCD array as a function of the data received on a periodic basis, and to determine a later position of the OTCCD array as a function of the data received on a periodic basis.

13. The matrix code scanner of claim 12, wherein the scanner is configured to sense movement in a first direction and a second direction, wherein the first direction is perpendicular to the second direction.

14. The matrix code scanner of claim 12, wherein the controller is configured to:

examine the first locations of the OTCCD array at a current instant and at two or more previous instants, and to determine if the first locations at the current instant and at the two or more previous instants are co-linear;

predict the second location of the OTCCD array using a linear extrapolation when the first locations at the current instant and the two or more previous instants are co-linear; and predict the second location of the OTCCD array by fitting a circle when the first location at the current instant and the two or more previous instants are not co-linear.

15. The matrix code scanner of claim 12, wherein the controller is configured to convert the rotational motion of the device into translation seen on the OTCCD array as a function of a design and location of a device grip for the matrix code scanner.

16. A hand held matrix code scanner comprising:

an orthogonal transfer charge-coupled device (OTCCD) including an array of pixels;

a controller coupled to the OTCCD;

a first sensor, coupled to the controller, for sensing movement of the scanner in a first direction; and a second sensor, coupled to the controller, for sensing movement of the scanner in a second direction;

wherein the controller is configured to move a first location of the OTCCD array on a silicon wafer to a second location on the silicon wafer as a function of data from one or more of the first sensor and the second sensor.

17. The hand held matrix code scanner of claim 16, wherein one or more of the first sensor and the second sensor comprise an inertial sensor.

* * * * *